June 4, 1968  F. M. ANGULO  3,386,341
APPARATUS FOR THE GENERATION AND ACCUMULATION OF ENERGY
Filed April 19, 1966  5 Sheets-Sheet 1

INVENTOR
FRANCISCO MARTINEZ ANGULO

BY Steinberg & Blake

ATTORNEYS

June 4, 1968 F. M. ANGULO 3,386,341
APPARATUS FOR THE GENERATION AND ACCUMULATION OF ENERGY
Filed April 19, 1966 5 Sheets-Sheet 3

INVENTOR
FRANCISCO MARTINEZ ANGULO
BY Steinberg & Blake
ATTORNEYS

June 4, 1968  F. M. ANGULO  3,386,341
APPARATUS FOR THE GENERATION AND ACCUMULATION OF ENERGY
Filed April 19, 1966  5 Sheets-Sheet 4

INVENTOR
FRANCISCO MARTINEZ ANGULO
BY Steinberg & Blake
ATTORNEYS

June 4, 1968  F. M. ANGULO  3,386,341
APPARATUS FOR THE GENERATION AND ACCUMULATION OF ENERGY
Filed April 19, 1966  5 Sheets-Sheet 5

INVENTOR
FRANCISCO MARTINEZ ANGULO

BY Steinberg + Blake

ATTORNEYS

United States Patent Office 3,386,341
Patented June 4, 1968

3,386,341
APPARATUS FOR THE GENERATION AND
ACCUMULATION OF ENERGY
Francisco Martinez Angulo, 37 Gobelas,
Las Arenas, Vizcaya, Spain
Continuation-in-part of application Ser. No. 405,077,
Oct. 20, 1964. This application Apr. 19, 1966, Ser.
No. 551,822
Claims priority, application Spain, Apr. 20, 1965,
312,012
7 Claims. (Cl. 91—92)

This application is a continuation-in-part of application Ser. No. 405,077, filed Oct. 20, 1964, now abandoned.

The present invention relates to apparatus capable of functioning either as a pump or as a motor.

This apparatus for the generation and reception of energy by means of the use of fluids has as its object that of transforming the energy created by pressure in fluids into mechanical energy, and vice versa, that is to say the transformation of mechanical energy into pressure energy, i.e. transformations of the type obtained by means of pistons, but with the fundamental characteristic that the mechanical reception terminal is a rotatory shaft which turns at a uniform speed.

This latter characteristic makes it possible to apply the apparatus to devices or mechanisms in which at the present time it is necessary to employ mechanical reduction devices, resulting in an additional cost of the said mechanisms. Thus, with the construction of the present invention it is possible to reduce the costs of the apparatus.

Consequently the apparatus of the invention reduces the number of mechanisms necessary for the generation and reception of energy in fluids, permitting the transformation of this latter type of energy into mechanical energy or vice versa, while using the smallest possible number of parts and with the best performance possible.

An essential characteristic of one embodiment of the invention is that the apparatus consists essentially of an annular channel, within which there are situated at equidistant positions a number of vanes united to a common shaft, these elements together constituting the rotor of the apparatus, and the said vanes dividing the channel into various equal parts.

Another characteristic of the invention consists of the fact that the apparatus is essentially endowed with a system of movable partitions which, in combination with inlet and outlet ducts, act as fluid-blocks extending across the annular channel in an appropriate position, determining the expulsion or admission of fluid under pressure, there thus being produced a continuous functioning of the apparatus.

Another characteristic of the invention is concerned with the fact that the said partitions adopt forms and positions such as to permit, by means of their rotation, the blocking of the channel, and in one and another position the passage of the vanes, the movement to attain such positions being attained in a completely automatic form and synchronized with the movement of the rotor.

A further characteristic of the invention, which corresponds to a preferential form for its manufacture, is concerned with the fact that the said partitions are operated by cams or lugs linked to the movement of the rotor.

An additional characteristic of the invention is the arrangement of two rotatory partitions whose shafts are parallel to the shaft of the machine, and which present a cavity for the passage of the vanes, the movement of the said partitions being synchronized since they are meshed with an intermediate toothed wheel which in addition serves as an intermediate partition.

Another characteristic of the invention is that the said partitions present a cavity of arched contour for the passage of the vanes, which cavity limits the toothed periphery.

Another characteristic of the invention is that due to the incomplete toothing of the partition the latter, when in an angular position, ceases to mesh with the teeth of the rotor, being impelled in the said position by the intermediate wheel impelled in turn by the peripheral toothing of the rotor through the other partition, the angular positions of the partitions being arranged in such a manner that the joint movement is produced in a continuous and synchronized manner.

Another characteristic of the invention consists in the arrangement of a check valve in the intermediate partition which on turning with the latter in certain positions permits the impulsion through the said positions of the fluid towards a secondary duct, and in another position the retention of the said fluid in the intermediate chamber, thus permitting the impulsion of the vanes in the zone included between the two partitions provided with the incomplete toothing.

Another characteristic of the invention is concerned with the arrangement of free ducts which are automatically opened or closed by the corresponding partition, which ducts permit the fluid to reach the intermediate chamber.

In order to facilitate the understanding of the invention, there are shown in the attached drawings in schematic form various examples of the construction of the device, which examples are included with a merely informative character.

In the said drawings, FIG. 1 is a front view, partly in section, of a device in accordance with one form of construction of the invention.

Figure 1:
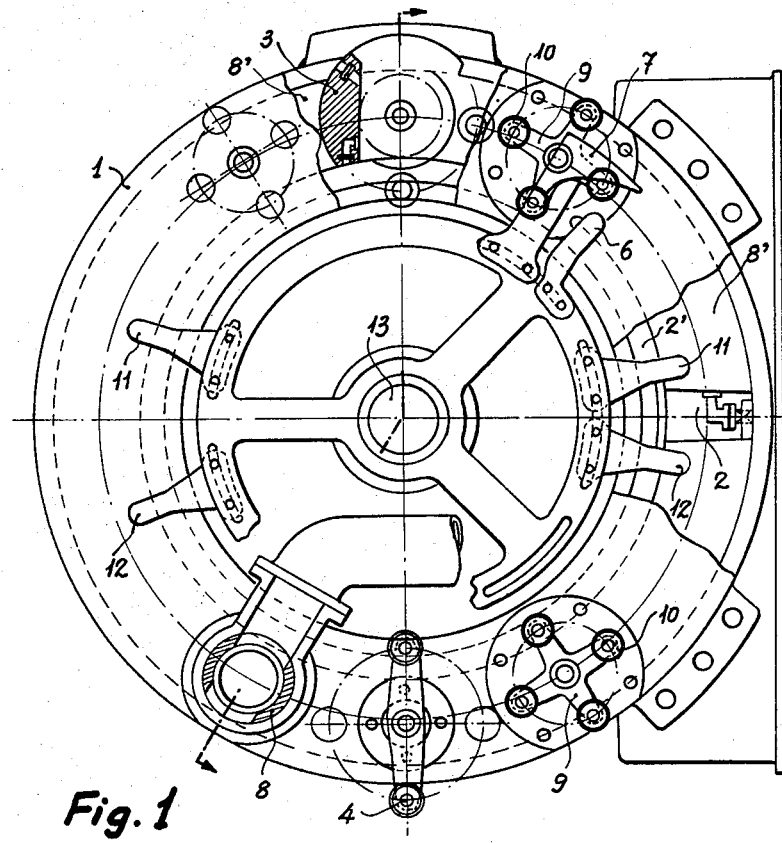

FIG. 1 is a front view, so that 1 represents the body of the housing; 1′ the cover of the body; 2 the blade which is movable in a circular direction; 2′ the rotor to which the blade 2 is united; 3 a diaphragm which makes it possible to block the channel 8′; 4 the lever for moving the diaphragm; 5 the roller which slides over the profile of the cam 6 for the movement of the diaphragm 3; 6 the cam to move the diaphragm; 7 the cam to reverse the movement produced by the cam 6; 8 the valves for the entry and exit of the fluid from the interior of the circular channel 8′; 8′ the circular channel along which the movable blade slides and through which the fluid circulates; 9 the lever to move the valves 8; 10 the roller of the lever 9 which slides over the profile of the cam 11, permitting the movement of the valves 8; 11 the cam to move the valves 8; 12 the cam to reverse the movement produced by the cam 11; 13 is the main shaft of the apparatus; 14 is the packing-gland nut; 16 the interior bearings of the main shaft.

The functioning of the apparatus is as follows:

The vanes 2 which are fixed to the rotor 2′ slide along the circular channel 8′, impelled by the pressure of the fluid which is in the circular channel. On the blade being moved, it causes the rotor 2′ and the main shaft 13 to turn, so that the exterior cams 6, 7, 11, and 12, carried by and rotatable with shaft 13, cause the opening and closing of the valves 8 so that the fluid, may enter and leave, at the proper time, the circular channel; in this manner the movable blade 2 receives the thrust of the fluid on one face and the other face impels the fluid which has already operated, in order to expel it towards the exterior of the apparatus.

Again, the partitions 3 operate at the appropriate time; at times they block the circular channel 8' so that the pressure may act on the movable blade, and at other times they withdraw leaving the channel free so that the movable vane may pass, thus permitting a continuous circular movement of the latter, of the rotor and of the main shaft 13.

The gear mechanism with its cams, rollers, levers and valves is designed in a flexible manner so that it may carry out its function according to the requirements of each apparatus and in accordance with the work which the apparatus in question is to perform, that is to say that the said mechanism can be adjusted to the movements which each apparatus needs.

Figure 3:
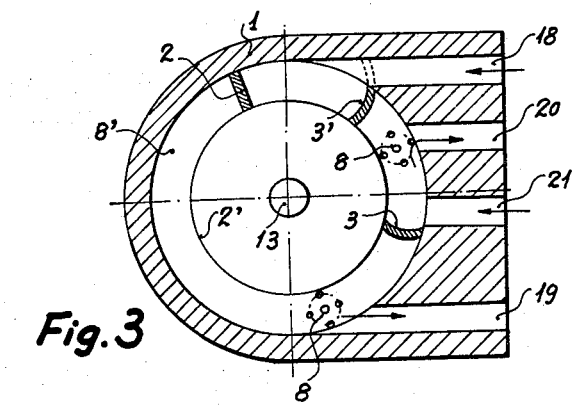
FIG. 3 is a simplified representation of the apparatus, in accordance with a variant form of construction.

Thus in FIG. 3 there is shown in schematic form a variant form of construction of the invention, in which the complex of inlet and outlet ducts is grouped at a part of the contour of the channel, the channel partitions having a double purpose: that of alternately blocking the channel and closing a duct.

In the said figure, when the partition 3' closes channel 8' the fluid enters through inlet duct 18 and impels the vane 2, moving the rotor 2'. In this movement the vane impels the fluid with its other face, the said fluid emerging through outlet ducts 19 and 20. Meanwhile the partition 3 closes the inlet duct 21.

After the vane 2 has overpassed the partition 3 the simultaneous movement of both partitions is produced, the partition 3' which closes the duct 18 withdrawing and the partition 3 becoming placed in the working or channel-closing position, and consequently the duct 21 opens.

The vane continues moving impelled by the fluid which enters through 21, 20 being closed.

Figure 4:
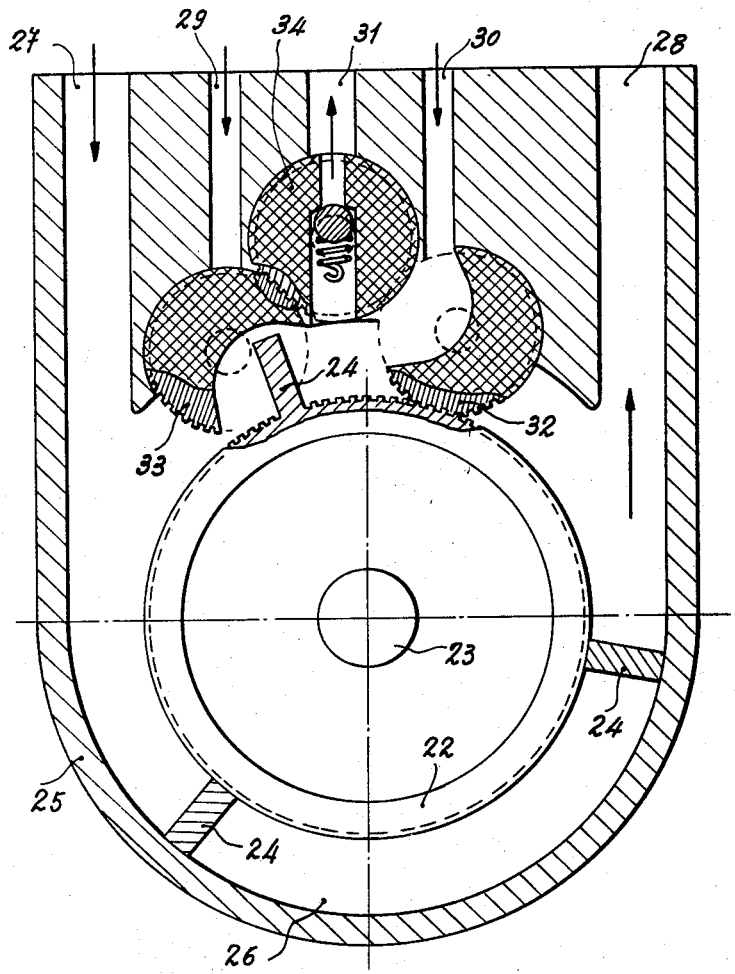
FIG. 4 shows a section in accordance with a normal plane with respect to the axis of rotation of an apparatus, in accordance with another form of construction of the invention.

In a variant form of construction, which is of special importance because of the simplification it provides in the system of partitions, and which is shown in FIG. 4, the apparatus consists of a rotor 22, fixed to the shaft 23, three vanes 24 being situated on the said rotor at positions equidistant one from another, the number of the said vanes being susceptible of variation. The said rotor has a toothed periphery which occupies its whole width, and forms, between its edge and the housing 25, a circular channel 26 which is connected to the inlet duct 27 and the outlet duct 28.

In the part which corresponds to the side of the said ducts there are arranged the auxiliary inlet ducts 29 and 30 and the outlet duct 31.

The rotatory partitions 32 and 33 have a toothed periphery which occupies the whole of their width, and an arched cavity which is devised to allow the vanes 24 to pass, the said partitions forming a hermetic seal with the cavity of the block and with the union to the toothing of the rotor.

The intermediate partition 34 meshes with both the above-mentioned partitions, and is equipped with a check valve of the ball type which rotates simultaneously with the said intermediate partition.

The rotor 22 has fitted on its periphery the vanes 24 which move within the circular channel 26, which is blocked by means of the partitions 32 and 33, which are connected to the rotor or rotors by means of a gear mechanism formed by the teeth of the partitions, both turning with the same velocity, and being synchronized in such a way that in a determined position the partitions allow the blades to pass thanks to the hollow space made in the said partitions, and in another position the said partitions block the circular channel 26.

The fluid is shown entering through the ducts 27 and 30 into the interior of the circular channel 26, along which slide the movable vanes, and emerges through duct 31 and the valve of the partition 34 and the duct 28. The duct 29 serves as an entry duct for the fluid for the case in which the apparatus rotates in the opposite direction. During reverse rotation of the rotor, the directions of flud flow in the ducts are respectively reversed.

Consequently, on the partition 33 or the partition 32 being closed, the fluid enters through 27 and impels the vanes 24, moving the rotor 22. In this movement the vanes impel the fluid with their other face, and the fluid emerges through ducts 28 and 31.

When one of the blades 24 approaches the partition 32, the latter is situated in a position so determined that the hollow made in it is a position to receive the said blade and to permit it to traverse the space of the said partition, closing in turn the inlet 30, while in the meantime the other partition 33 is in contact with the rotor, blacking the circular channel 26 and closing the inlet 29.

After the blade 24 has passed the partition 32, the same combination is reproduced with the partition 33, the latter permitting the passage of the blade 24 through the hollow situated in the said partition, the partition 32 then closing the circular channel 26 and opening the duct 30.

The blades continue to move, being impelled by the fluid which enters through 30 and 27.

It will be noted that when the cavity of one of the partitions 32 or 33 is directed toward the rotor, the interruption in the teeth of the latter partition prevents it from being turned by the teeth of the rotor, but at this time the turning is transmitted from one of the partitions 32 or 33 to the other by way of the teeth of the intermediate partition 34. In this way the proper positioning of the partitions is assured even though at times one or the other of the partitions 32 and 33 do not mesh with the teeth of the rotor.

Figure 5:
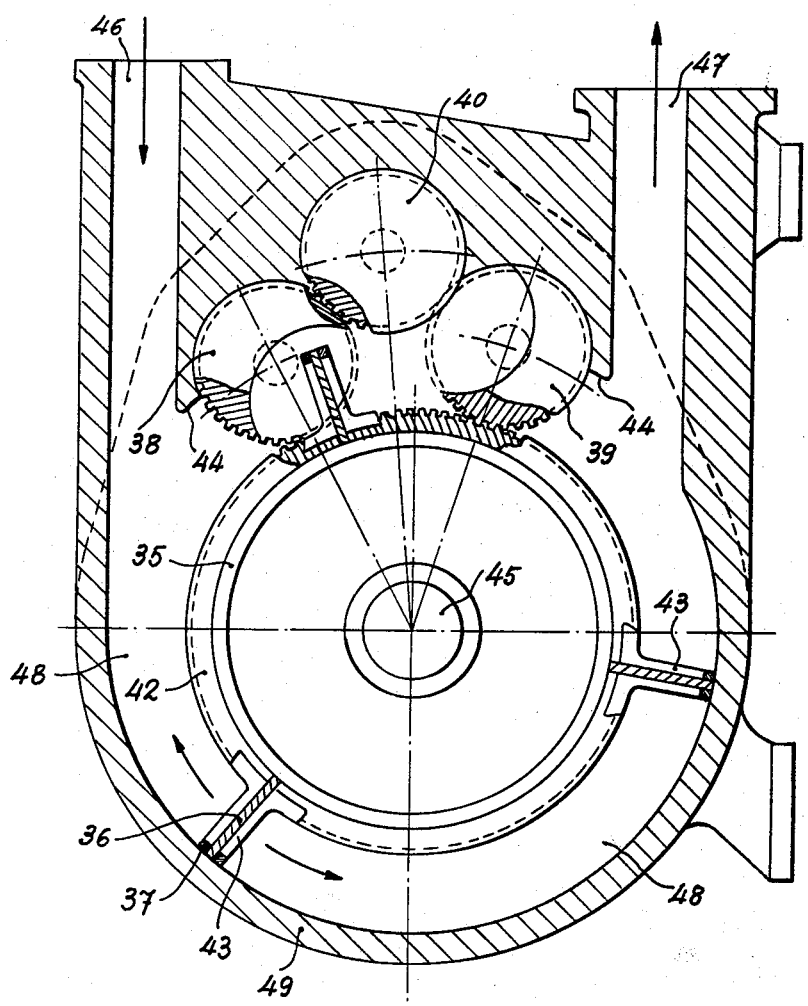
FIGS. 5 and 6 are respectively sections in accordance with a plane at right angles to the axis of rotation and with a diametric plane of a variant form of construction represented in FIG. 4.
Figure 6:
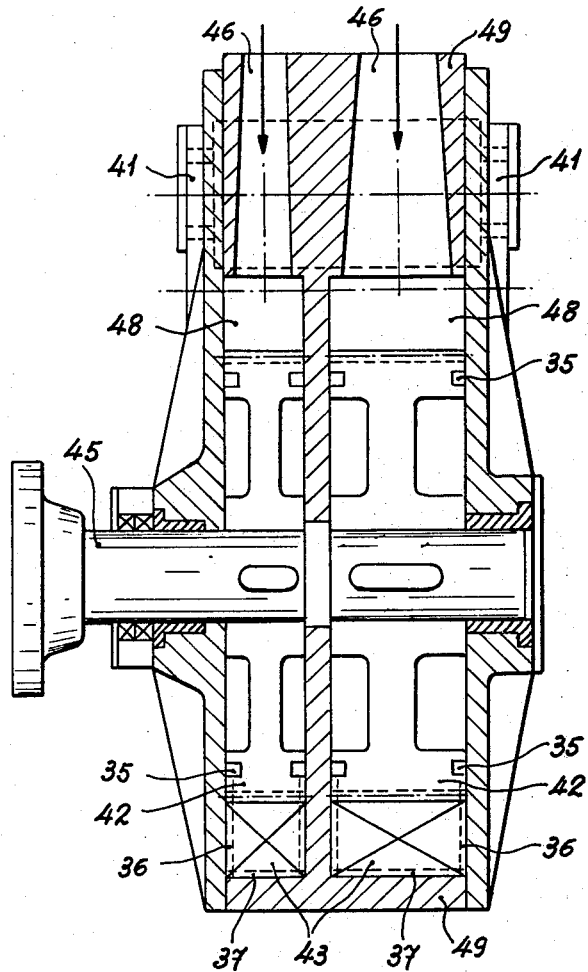

FIG. 5 shows another form of construction of the apparatus in which the check valve arranged on the intermediate wheel has been eliminated. This form of construction of the apparatus includes two rotors, one of which has a larger section than the other, as shown in FIG. 6, which rotors have been arranged so as to obtain various ranges of speeds on the shaft common to both, according as the fluid is impelled by one or other rotor or by both at the same time.

Likewise, circular sealing segments 35 have been fitted at the side of the rotor with the aim of achieving as perfect as possible a hydraulic seal, and lateral sealing segments 36 and peripheral sealing segments 37 have been fitted to the vanes, that is to say on the surfaces of the latter, which are in contact with the lateral closures and the housing 49, which produces a more perfect hydraulic seal and a compensation through adjustment in the case of wear and tear.

The partitions 38 and 39, as well as the intermediate wheel 40, are each constituted by a single piece, which operates in rotation, being supported by lateral shafts 41 with their respective supports.

As may be appreciated, in this version of the apparatus the ducts 31, 30 and 29 have been eliminated, since they are not required for the functioning of the apparatus, and their elimination results in an important simplification. The duct made in the intermediate partition has also been eliminated, as well as the ball valve and its spring.

In order to compensate for the elimination of the above-mentioned elements, it has been necessary to separate the centers of the intermediate wheel 40 and the rotor 42. Again, more clearance has been provided in the interior of the partition for the exterior edge of each of the vanes 43, and lastly between the zone 44 of the housing and the above-mentioned edges it has been necessary to leave an ample measure of clearance so that the vanes may not encounter a counter-pressure of fluid between themselves and one of the partitions on passing through the said zone 44; as a result of these features it has been possible to eliminate the said ducts.

The main shaft 45 is fitted with the corresponding bearings and nuts, as well as with retaining elements to prevent the emergence of the fluid to the exterior.

Figure 2:
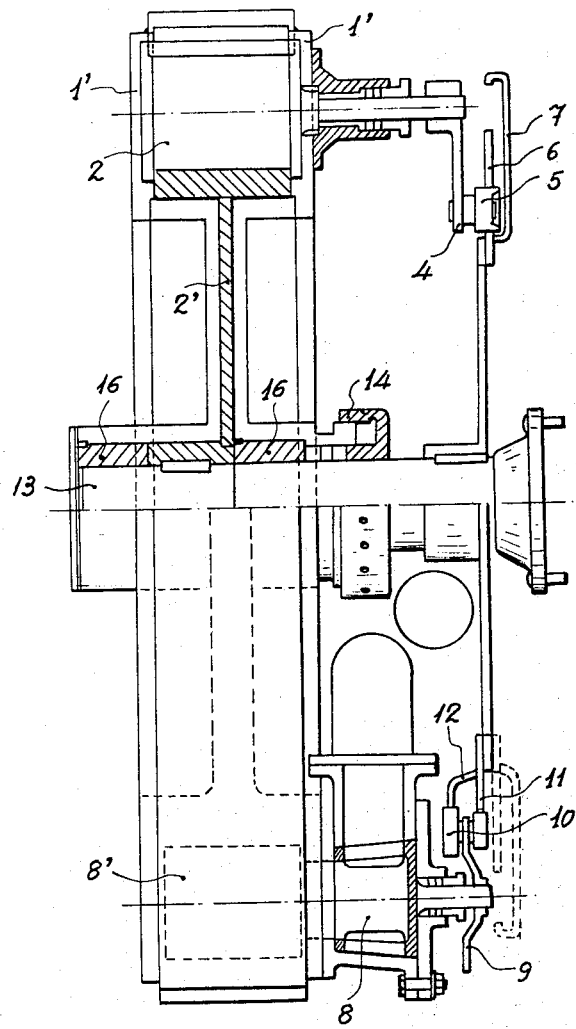
FIG. 2 shows a semi-sectioned lateral view of the apparatus shown in FIG. 1.

As has already been said, in FIGS. 4 and 5 there is shown a variant form of construction in which the inlet and outlet ducts are grouped on one side at less than 180° from each other, as is also the case with the embodiment of FIGS. 1–3 where each inlet and outlet duct is located close to the turnable partition 3 or 3′ situated therebetween; again the partitions and the rotor or rotors have a groove sunk in their periphery across the whole width so that when they mesh together there is obtained the hydraulic sealing of the fluid which reaches the interior of the apparatus with a certain pressure: the same occurs with the intermediate wheel which also has a groove sunk in its periphery across its whole width, by means of which it meshes with the two partitions with the double function of synchronizing their movements with the rotor and that of obtaining a hydraulic sealing between the zone impelling the fluid and that of evacuation.

As shown in FIG. 5, when the partition 39 or the partition 38 is closed, the fluid under pressure enters through 46 and impels the vanes 43, since either one of the two partitions prevents the said fluid from flowing directly from inlet duct 46 to outlet duct 47. This causes the pressure of the fluid to thrust against the vane or vanes 43, producing the rotation of the rotor 42. In this movement the vanes impel the fluid with their other face, the fluid emerging through outlet duct 47.

When one of the vanes 43 approaches the partition 39, the latter is in an open position, so that the hollow made in the said partition remains in a position to house the said vane and to permit it to traverse the space of the said partition, which closes once the vane has passed, and in the meantime the other partition 37 is in peripheral contact with the rotor 42, blocking the circular channel 48.

After the vane 43 has overpassed the partition 39, the same operation is repeated with the partition 38, the latter permitting the passage of the vane 43 through the hollow in the said partition, the partition 38 then closing the said circular channel 48.

The vanes continue to move, impelled by the fluid under pressure which enters through 46 and emerges through 47.

Thus, with the apparatus of the invention which is capable of functioning either as a pump or as a motor, there is a housing which has in its interior a circular channel in which a vane means turns continuously, this vane means including at least one vane unit. Furthermore, a flow-control means, for controlling the flow of fluid into and out of the channel, communicates therewith and includes at least one unit composed of an inlet duct and an outlet duct, both of which communicate with the channel, and these ducts are situated at one side of the center of the circular channel at an angular distance from each other which is less than 180°. The structure of the invention includes at least three of these units so that in the combination of the invention there are, as a minimum, either two units each composed of an inlet and outlet duct, coacting with a single vane unit, as in the embodiment of FIGS. 1–3, or there are at least two vane units coacting with a single unit composed of an inlet and outlet duct, as in the embodiment of FIGS. 4–6, thus assuring a continuous application of the fluid at both sides of each vane to assure continuous rotary movement of the rotor. Situated between the inlet and outlet duct of each unit of the flow-control means is a rotary partition means which in one position extends across the channel to block the flow of fluid across the space occupied by the rotary partition means and which in another position provides in the channel clearance for passage of a vane unit.

It is evident that a diversity of variant forms of construction may be effected in the examples described, without this causing any substantial variation in the invention.

I claim:

1. In an apparatus capable of functioning as a pump or motor, a housing formed in its interior with a circular channel surrounding a predetermined axis, rotary vane means for turning continuously about said axis along said channel and including a vane unit, fluid-control means communicating with said channel for directing fluid into and out of the latter respectively toward a trailing face of said vane unit and from a leading face of said vane unit, said flow-control means including a unit composed of an inlet duct and an outlet duct both communicating with said channel and spaced from each other on one side of said axis at an angle of less than 180°, both of said means together including at least a total of three of said units so that at least two of said units of one of said means coact with at least one of said units of the other of said means to provide for continuous, uninterrupted rotary movement of said vane means in said channel, and partition means situated at said one side of said axis between said inlet and outlet duct and having a blocking position extending across said channel occupying a predetermined space therein and a non-blocking position providing for clearance for said vane means when the latter passes through said space.

2. The combination of claim 1 and wherein said rotary vane means coacts with said partition means for displacing the latter between said positions thereof in synchronism with the movement of said vane means to clear the latter when said vane means moves through said space.

3. The combination of claim 2 and wherein said flow-control means includes at least two units each composed of an inlet and an outlet duct, and said rotary partition means being situated between the inlet and outlet ducts of each of the latter units.

4. The combination of claim 2 and wherein said fluid-control means includes two units each having an inlet duct and an outlet duct, and said partition means being provided for each of said units with each partition means, when in its non-blocking position, closing the inlet duct of the unit with which it coacts.

5. The combination of claim 2 and wherein said rotary vane means includes a plurality of vane units equidistantly distributed about said axis, and said rotary partition means including a pair of rotary partitions situated between said inlet and outlet duct and both formed with cavities through which said vane units pass when said pair of partitions are in their non-blocking positions, said pair of rotary partitions having external toothed surfaces and said rotary vane means having an external toothed surface meshing with said toothed surfaces of said pair of partitions to rotate the latter in synchronism with the movement of the vane units, said meshing engagement between said partitions and said rotary vane means being interrupted when said partitions are in said non-blocking positions thereof, and said rotary partition means including a third, intermediate rotary partition situating between and meshing with both of said pair of rotary partitions for transmitting rotary movement therebetween to determine the angular positions thereof even when said pair of partitions do not mesh with said rotary vane means.

6. The combination of claim 5 and wherein a pair of inlet ducts communicate with said channel through said cavities of said pair of partitions, respectively, and an outlet duct communicates with said intermediate partition, said intermediate partition being formed with a passage extending therethrough to provide communication between the latter outlet duct and said channel and said intermediate partition carrying in its interior a non-return valve for controlling the flow of fluid through said intermediate partition to said outlet duct, so that fluid can enter into and flow out of the space between said pair of partitions to act on a vane unit situated between said pair of partitions.

7. The combination of claim 5 and wherein said intermediate partition is in the form of a solid body, said channel having at its region situated between said inlet duct and said outlet duct a radial dimension greater than that of each vane unit so that each vane unit moves with clearance through the channel at its portion situated between said inlet and outlet duct.

References Cited

UNITED STATES PATENTS

| | | | |
|---|---|---|---|
| 614,846 | 11/1898 | Dibbell | 91—65 |
| 691,604 | 1/1902 | Crook | 91—113 |
| 709,254 | 9/1902 | Becht | 91—92 |
| 888,806 | 5/1908 | Hopkins | 91—65 |
| 2,751,846 | 6/1956 | Lapsley | 103—125 X |
| 2,920,610 | 1/1960 | Breelle | 91—92 X |

EVERETTE A. POWELL, JR., *Primary Examiner.*